United States Patent [19]

Telford

[11] Patent Number: 4,461,460
[45] Date of Patent: Jul. 24, 1984

[54] WINCH

[75] Inventor: Thomas M. Telford, Gladstone, Oreg.

[73] Assignee: Warn Industries, Inc., Kent, Wash.

[21] Appl. No.: 406,778

[22] Filed: Aug. 10, 1982

[51] Int. Cl.³ .......................... B66D 1/22; B66D 5/20
[52] U.S. Cl. .................................... 254/344; 188/337;
254/345; 254/347; 254/378
[58] Field of Search ............... 254/344, 345, 350, 351,
254/368, 375, 378, 347, 370; 188/70 B, 70 R,
78, 251 A, 336, 337, 342; 242/99

[56] References Cited
U.S. PATENT DOCUMENTS

| | | | |
|---|---|---|---|
| 320,222 | 6/1885 | Weimer | 254/370 X |
| 1,285,663 | 11/1918 | Fouse . | |
| 2,423,070 | 6/1947 | Sayles | 188/336 X |
| 2,891,767 | 6/1959 | Armington, Jr. . | |
| 3,071,349 | 1/1963 | Glaze | 254/344 |
| 3,107,899 | 10/1963 | Henneman | 254/347 |
| 3,319,492 | 5/1967 | Magnuson . | |
| 3,382,953 | 5/1968 | Wilkinson | 188/336 |
| 3,627,087 | 12/1971 | Eskridge . | |
| 4,004,780 | 1/1977 | Kuzarov . | |
| 4,118,013 | 10/1978 | Christison et al. | 254/347 |
| 4,185,520 | 1/1980 | Henneman et al. . | |
| 4,227,680 | 10/1980 | Hrescak . | |
| 4,344,587 | 8/1982 | Hildreth | 242/99 |

Primary Examiner—S. Levy
Assistant Examiner—Katherine Jaekel
Attorney, Agent, or Firm—Graybeal & Cullom

[57] ABSTRACT

A winch (10) is powdered by a motor (20) mounted at one end of a drum (12) through a three-stage planetary drive train (26) disposed adjacent the opposite end of the drum (12). The drive train (26) includes elongate drive shaft (25) which extends longitudinally through the interior of the drum (12) toward the motor (20). A brake-clutch assembly (24), disposed within the interior of the drum (12) operably interconnects motor (20) and drive shaft (25). The brake-clutch assembly (24) automatically operates in response to the magnitude and direction of the torque being transmitted between motor (20) and drive shaft (25). In operation, the brake-clutch assembly (24) permits the drive shaft (25) to rotate relative to and power the drum (12) to reel in the loaded drum cable and then frictionally locks the drive shaft (25) to the inside diameter of the drum (12) to hold the load on the drum cable when motor (20) is stopped. The brake-clutch assembly (24) also frictionally bears against the inside diameter of the drum (12) when motor (20) is operating in the reverse direction to reel out the load attached to the drum cable thereby controlling the rotational speed of the drum (12) to prevent it from overrunning the motor (20).

23 Claims, 4 Drawing Figures

WINCH

DESCRIPTION

1. Technical Field

The present invention relates to a winch, and more particularly to a winch having a brake-clutch assembly which frictionally engages against the inside diameter of a winch drum.

2. Background Art

Winches of the nature of the present invention typically include a cable winding drum which is rotatably driven by a reversible electric or hydraulic motor or other type of power device. A speed reducing drive train is interposed between the hydraulic or electrical motor and the drum to provide torque amplification and also to reduce the typically relatively high speed of the motor. A brake assembly is commonly operably interconnected to the drive train to prevent unwinding of the drum when the motor is stopped and a load is attached to the cable. When the winch is being operated to pay out the cable, for instance, to lower a load, the brake prevents the drum from overrunning the motor thus acting as a governor to limit the cable pay out speed of the drum. An inherent characteristic of such winches is the generation of large quantities of heat when the cable is loaded and the brake is applied to limit the rotational speed of the drum when lowering the load.

In one type of known winch, the brake is composed of a plurality of thin, alternating friction discs and steel discs with either the friction or steel discs splined to a portion of the winch which is stationary relative to the drum and the other of the friction or steel plates splined either directly or indirectly to the drum. Means are provided to squeeze the friction and steel plates together to either stop or control the rotational speed of the drum. When the brake is heavily used, large amounts of heat are produced in the plates as they frictionally rub against each other. If the plates are heated to too high of a temperature, the friction material on the friction plates may become glazed and/or the plates may warp, thereby reducing the effectiveness of the brake. As a result, increased squeezing pressures must be applied to the brake plates to control the speed of or to stop the drum thereby generating even larger amounts of heat causing further damage to the brake plates. Examples of winches using this type of brake are disclosed by U.S. Pat. Nos. 3,107,899; 3,319,492; 3,627,087; 4,118,013; 4,185,520; and 4,227,680.

In another type of winch, a brake assembly is composed of a central disc or ring which is squeezed between a pair of circular or annular brake pads disposed on opposite sides of the central disc. Typically, either the disc or one of the pads is anti-rotationally connected to the housing or some other stationary portion of the winch while the opposite member is directly or indirectly coupled to the drum. Means are provided for pressing the brake pads against the center disc. Examples of this type of winch are disclosed by U.S. Pat. No. 2,891,767 and U.S. Pat. No. 4,004,780 (assigned to the assignee of the present application). In the '780 patent a plurality of friction buttons extend through axial holes formed in a central disc to engage against the brake pads. Although the central disc of the brake assemblies disclosed in these two patents are thicker than the friction or steel discs of the brake assemblies of the above-noted patents, the discs still do not have enough mass to dissipate the heat generated during braking of the drum at a rate fast enough to prevent a substantial rise in temperature in the brake assembly, leading to reduced effectiveness of the brake assembly.

In a further type of winch, a frustoconically shaped recess is formed in one flange of a winch drum to receive a correspondingly shaped disc which is anti-rotationally mounted on a base plate. A linkage system is provided to axially shift the disc into engagement with the drum flange to control the rate at which cable is payed out from the drum. An example of this type of winch is disclosed by U.S. Pat. No. 1,285,663. A limitation of this type of winch is that the brake disc is not capable of modulating the rotational speed of the drum during powered pay out of the cable.

Accordingly, it is a principal object of the present invention to provide a winch having a brake-clutch assembly which frictionally bears against the inside diameter of the which drum thereby utilizing the substantial mass and surface area of not only the winch drum, but also the steel cable wound around the drum to rapidly dissipate the heat generated during braking, especially when operating the winch under power to pay out or lower a substantial load. It is also an object of the present invention to provide an electrically powered winch having sufficient gear reduction to provide the necessary torque amplification to minimize the required horsepower of the motor while also minimizing the overall size of the winch.

DISCLOSURE OF THE INVENTION

The winch of the present invention includes a hollow cable winding drum rotatably mounted on a pair of upright support structures for rotation about a longitudinal axis. A reversible motor is mounted on one of the support structures to extend longitudinally from the adjacent end of the drum. A speed reducing gear train is coupled to the opposite end of the drum and is disposed within a housing mounted on the adjacent support structure. The gear train is composed of first, second and third planetary drives which are interconnected in torque transmitting relationship. The gear train also includes a drive shaft interconnected with the first stage planetary drive and extending through the interior of the drum toward the reversible motor disposed at the opposite end of the drum. A brake-clutch assembly is disposed within the drum to operably interconnect the reversible motor with the drive shaft.

The brake-clutch assembly includes a brake subassembly disposed within the drum and operably interconnected with the drive shaft through an overrunning clutch. The brake subassembly includes a pair of split friction rings having a nominal outside diameter slightly smaller than the inside diameter of the drum and a frustoconically shaped inside diameter which slidably engages over a mandrel formed in a corresponding double frustoconical shape. The overrunning clutch is disposed between the inside diameter of the mandrel and a brake shaft, which is longitudinally aligned and interconnected with the drive shaft. The overrunning clutch permits the mandrel to rotate in one direction but not in the opposite direction relative to the brake shaft.

The brake-clutch assembly also includes an actuator for actuating the brake subassembly. The actuator is composed of a drive cam rotatably driven by the motor to engage with a cam follower splined to the brake shaft. The drive cam shifts the cam follower axially along the brake shaft toward the brake subassembly to squeeze the friction rings against the mandrel to expand the friction rings radially against the inside diameter of the drum when a torque load is being transmitted between the motor and the drive shaft in a first relative direction corresponding to the direction of rotation of the motor when operating the drum to reel in a load on the drum cable. When the motor is operated in this mode, the overrunning clutch allows the brake shaft to rotate relative to the brake mandrel and friction rings which are securely locked against the inside diameter of the drum. A torque load is also transmitted between the motor and the drive shaft in this same relative direction when the motor is operated in reverse direction to reel out a load attached to the drum cable. In this operational mode of the winch, the loaded cable attempts to increase the rotational speed of the drum to overrun the motor. However, the actuator squeezes the friction rings against the mandrel thereby enlarging the friction rings to bear against the inside diameter of the drum. In this instance, the overrunning clutch locks the mandrel to the brake shaft so that the frictional drag acting between the friction rings and the drum is transmitted to the brake shaft thereby modulating the speed of the drum so that the drum does not overrun the motor.

When the motor is operated in reverse direction to pay out the cable which is either unloaded or only lightly loaded, the drive cam member allows the cam follower to shift away from the brake subassembly thereby allowing the brake friction rings to contract away from the inside diameter of the drum so that the drum is allowed to rotate in reverse direction. In this mode of operation of the winch, the relative torque transmitted between the motor and the drive shaft is acting in the direction opposite to the direction of torque transmission between these components when the motor is being operated in forward direction to reel in the load or when the motor is operated in reverse direction to pay out a large load, which load attempts to induce the drum to overrun the motor.

According to another aspect of the present invention, the self-energizing capacity of the friction rings may be varied to accommodate various factors, such as the capacity of the winch, the size and rotational speed of the motor, and the friction coefficient acting between the friction rings and the inside diameter of the drum. This is accomplished by forming a plurality of longitudinally extending slots about the inside diameter of the friction rings to engage with corresponding drive pins extending radially outwardly from the mandrel. The drive pins antirotationally interconnect the friction rings with the mandrel while allowing the friction rings to slide along the frustoconical portions of the mandrel. The further away the particular slots which are engaged with the drive pins are located from the leading ends of the friction rings as referenced from the split portion of the rings, the greater the tendency of the friction rings to expand when initially engaged against the inside diameter of the drum thereby increasing the self-energizing capacity of the friction rings.

In a further aspect of the present invention, the first and second stage planetary drives are disposed side-by-side within the housing. The two planetary drives include a common ring gear which is slidably engageable with and disengageable from a stationary external gear integrally formed with the housing. Disengaging the common ring gear from the stationary housing gear disconnects the drive shaft from the drum thereby allowing the drum to free wheel, for instance to rapidly manually unwind the cable from the drum. A shifting lever is manually operable to slide the ring gear into engagement with and out of engagement from the stationary housing gear. In the free-wheeling mode of the winch of the present invention, the drum is drivingly interconnected with the third stage planetary drive which imposes a certain amount of drag force on the drum to prevent the drum from continuing to spin after the pull on the cable has been terminated, thus avoiding tangling of the cable.

BRIEF DESCRIPTION OF THE DRAWINGS

The details of one typical embodiment of the present invention will be described in connection with the accompanying drawings, in which.

BEST MODE OF THE INVENTION

Figure 1:
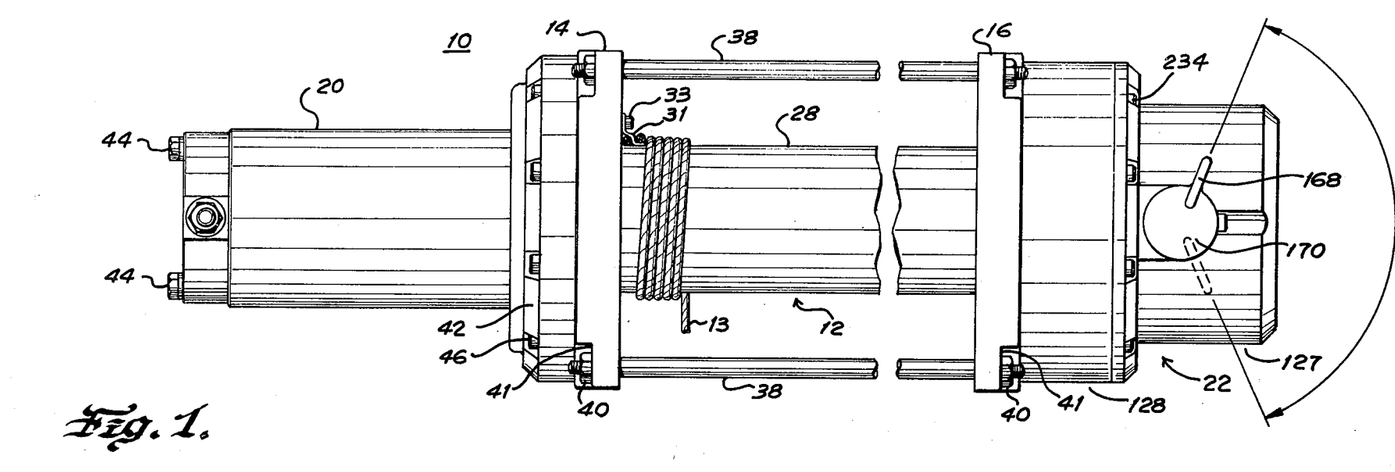
FIG. 1 is a plan view of a winch constructed according to the present invention.
Figure 2:
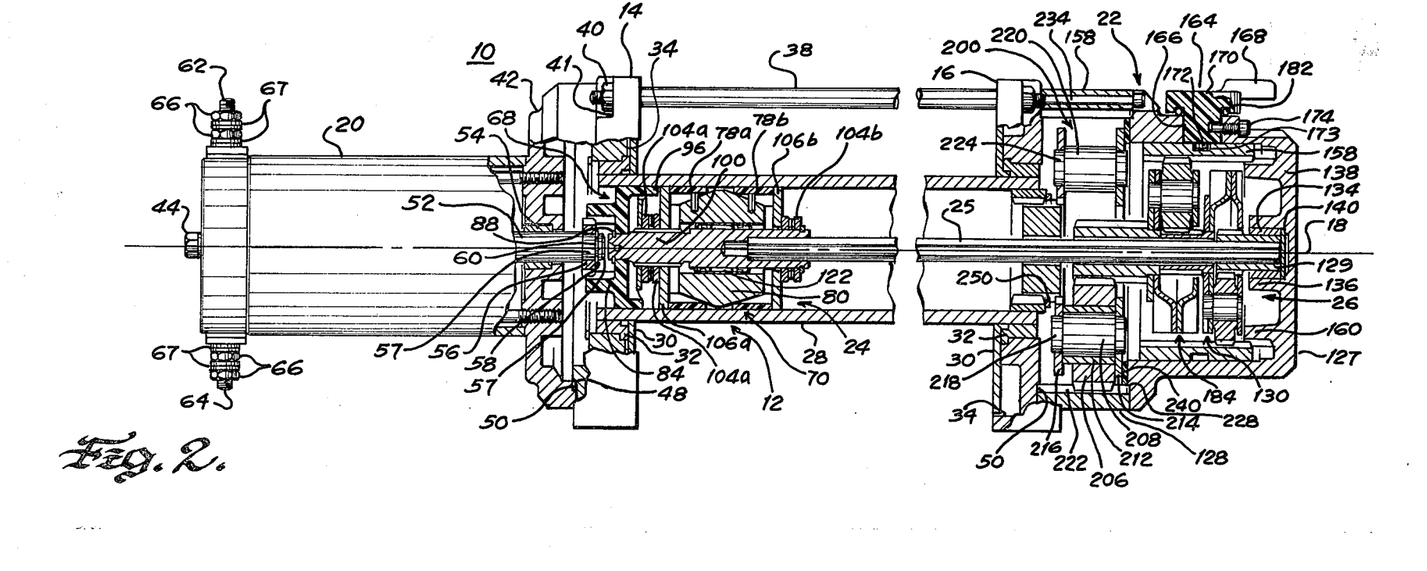
FIG. 2 is a side elevational view of the winch illustrated in FIG. 1, with portions broken away to illustrate the internal components of the winch.

Referring initially to FIGS. 1 and 2, a winch 10 constructed according to the best mode of the present invention currently known to applicant includes a drum 12 supported by a pair of upright support structures 14 and 16 for rotation about a longitudinal central axis 18. A reversible motor 20 is mounted on support structure 14 located to the left or first side of drum 12, as viewed in FIGS. 1 and 2, to extend longitudinally of the drum. A nonrotatable gear train housing 22 is mounted on support structure 16 located to the right or second side of drum 12 to extend longitudinally outwardly from the drum. Motor 20 drives a brake-clutch assembly 24 which is disposed within the interior of drum 12. A drive shaft 25, which is disposed coaxially with axis 18, operably interconnects brake-clutch assembly 24 with a speed reducing gear train 26 disposed within housing 22. Gear train 26 is coupled to the right end portion of drum 12 to drive the drum at a substantially reduced speed relative to the rotational speed of motor 20.

Continuing to refer specifically to FIGS. 1 and 2, drum 12 includes a hollow tubular spool 28 on which a cable 13 is wound. Flat, annularly shaped end flanges 30 are welded or otherwise secured to spool 28 a short distance inwardly from each end of the spool. Antifriction bushings 32 engage over the end portions of spool 28 disposed outwardly of flanges 30 and abut against the adjacent faces of the end flanges to antirotationally support the spool. Bushings 32 engage within central circular openings formed in support structures 14 and 16. An anchor bracket 31 is secured to the end flange 30 at the left end of spool 28, as shown in FIGS. 1 and 2, by capscrew 33 to attach the end of cable 13 to drum 12.

Preferably the left and right support structures 14 and 16 are constructed identically to each other in a generally rectangular shape. A shallow, annularly-shaped recess 34 is formed in the inside face portions of support structures 14 and 16 for receiving spool end flanges 30. A pair of elongate tie rods 38 interconnect the upper portions of support structures 14 and 16. Tie rods 38 extend through clearance openings formed in the upper corner portions of support structures 14 and 16 to threadably engage with standard fasteners, such as nuts 40, which bear against recessed corner bosses 41 formed in the upper corners of the support structures. Tie rods 38 serve to maintain the upper portions of support structures 14 and 16 in proper spaced relationship to support spool 28 without causing the spool to bind with the support structures even when winch 10 is subjected to high loads during pay out or pay in of cable 13. The bottom portions of support structures 14 and 16 may be secured to a mounting bracket, not shown, or other structure by any convenient means such as by use of mounting flanges, not shown, typically formed at the base of the drum support structures.

Motor 20 is mounted on left support structure 14 through the intermediacy of a generally circularly shaped, formed adapter plate 42. Motor 20 is attached to adapter plate 42 by a pair of elongate bolts 44 which extend through diametrically opposed clearance holes formed in the outer casing of the motor to engage with aligned threaded holes formed in the adapter plate. Adapter plate 42 is in turn secured to mounting bracket 14 by a plurality of fasteners, such as bolts 46, extending through clearance openings spaced around the outer circumferential portion of the adapter plate to engage with aligned threaded openings formed in left support structure 14. Adapter plate 42 is centrally aligned relative to the drum rotational axis 18 by engagement of a shallow internal gear 48, formed around the internal circumference of the adapter plate in the side of the adapter plate facing left support structure 14, with a mating external gear 50 extending transversely outwardly from the side of support structure 14 facing motor 20. Preferably gears 48 and 50 are integrally formed with adapter plate 42 and support structure 14, respectively, to simplify the construction and reduce the overall manufacturing cost of winch 10.

As illustrated in FIG. 2, motor 20 includes an output shaft 52 which extends through a central opening formed in adapter plate 42 to extend slightly within the interior of drum 12. Output shaft 52 is antifrictionally supported by a bushing 54 which is pressed within the central opening of adapter plate 42. An output gear 56 is secured to the end 57 of shaft 52 for rotation with the shaft. An oblong opening is centrally formed in gear 56 to snugly engage over the correspondingly shaped, reduced-size end portion 57 of shaft 52 to antirotationally interconnect the gear with the shaft. Gear 56 is retained against the larger circular portion of shaft 52 by a snap ring 58 which engages within a groove in shaft end portion 57 at the side of gear 56 facing drum 12.

Reversible motor 20 is illustrated in FIGS. 1 and 2 as being electrically powered. Diametrically opposed terminals 62 and 64 are located on the distal ends of motor 20 opposite drum 12 for interconnection with electrical lines, not shown, which provide electrical energy to the motor. Appropriate hardware, such as nuts 66 and washers 67, are threadably engaged on terminals 62 and 64 to retain standard electrical connectors, not shown. Rather than being electrically powered, motor 20 could instead be hydraulically powered or even replaced with a power takeoff shaft or other type of power source without departing from the spirit or scope of the present invention.

Figure 3:
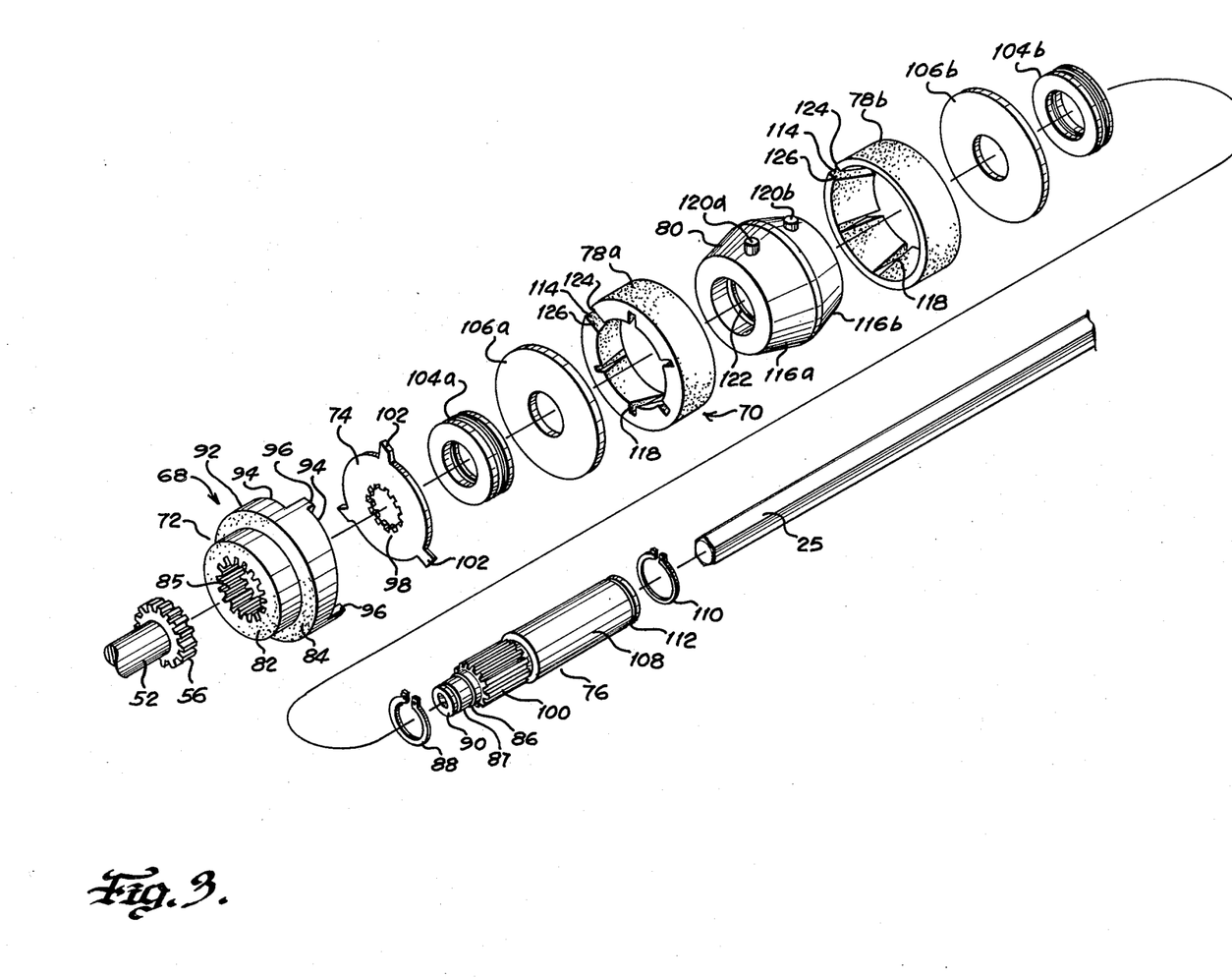
FIG. 3 is an isometric, exploded view of the brake-clutch assembly of the present invention taken from the left side of FIGS. 1 and 2.

Next referring specifically to FIGS. 2 and 3, winch 10 includes a brake-clutch assembly 24 interconnected between motor 20 and a drive shaft 25 of gear train 26 which in turn is rotationally coupled to drum 12. Brake-clutch assembly 24 operates in response to the magnitude and direction of torque load acting or being transmitted between motor 20 and drive shaft 25 to permit rotation of the drive shaft (in the clockwise direction as shown in FIG. 3) when the motor is operated to reel in cable 13 and then to frictionally lock the drive shaft to the inside diameter of drum spool 28 to hold the load on cable 13 when motor 20 is switched off thereby preventing reverse (counterclockwise rotation as viewed from the left side of FIGS. 1 and 2) rotation of drum 12. The brake-clutch assembly 24 also frictionally bears against the inside diameter of spool 28 when motor 20 is operated in reverse direction to reel out a load attached to cable 13 thereby controlling the rotational speed of the drum to prevent drive shaft 25 from overrunning motor 20. As explained more fully below, when winch 10 is reeling in a load, holding a load suspended or acting on cable 13 or paying out a load on cable 13 at a controlled rate of speed, the relative torque load acting between motor 20 and drive shaft 25 is in the same relative rotational direction.

In basic form, brake-clutch assembly 24 includes a brake assembly 70 composed of a pair of split friction rings 78A and 78B having outside diameters which are nominally slightly smaller than the inside diameter of spool 28 and having a frustoconically shaped inside diameter which engages with a mandrel 80 formed in a corresponding double frustoconical shape. An overrunning clutch 122 is disposed between mandrel 80 and brake shaft 76 to permit the brake shaft to rotate clockwise, as shown in FIG. 3, but not counterclockwise relative to mandrel 80. Brake-clutch assembly 24 also includes an actuator for squeezing friction rings 78A and 78B against mandrel 80 causing the friction rings to expand outwardly to frictionally bear against the inside diameter of spool 28. Actuator 68 includes a drive cam member 72 rotationally driven by motor 20. The drive cam member 72 engages with a cam follower 74 splined to a brake assembly shaft 76 which is antirotationally connected to drive shaft 25. Drive cam member 72 shifts cam follower 74 axially along shaft 76 toward brake assembly 70 to squeeze the friction rings 78A and 78B against mandrel 80 to enlarge the friction rings or allow the cam follower to shift away from the brake assembly to contract the friction rings depending on the direction and magnitude of the torque load transmitted between motor 20 and drive shaft 25, through the drive cam and cam follower.

Now describing the construction and operation of the brake-clutch assembly 24 in greater detail, drive cam member 72 of actuator 68 includes a hub portion 82 extending transversely outwardly from a circular central wall 84 toward motor 20. An internal gear 85 is integrally formed in the inside diameter of hub portion 82 to engage with drive gear 56 secured to motor output shaft 52. A pilot hole is formed in the center of central wall 84 to receive the adjacent circular end portion 87 of brake shaft 76 of brake assembly 70 to thereby rotationally journal cam member 72 on the brake shaft. Cam member 72 is retained against a shoulder 86 formed on shaft 76 by a snap ring 88 receivable within a groove 90 formed at the end of shaft circular portion 87 adjacent motor drive shaft 52. Drive cam member 72 includes an annular rim portion 92 having an outer diameter slightly smaller than the inside diameter of spool 12 and extending transversely outwardly from center wall 84 in the direction opposite to cam hub portion 82. A plurality of helical, axially facing cam surfaces 94 are formed in the end of cam rim portion 92 opposite cam central wall 84. Lugs 96 extend transversely of cam rim portion 92 at locations between adjacent cam surfaces 94 to project outwardly beyond the cam surfaces.

The actuator 68 also includes a cam follower 74 having a flat, annularly-shaped major portion 98 formed with a splined central opening for engagement with a splined intermediate portion 100 of brake shaft 76 to allow the cam follower to slide along the brake shaft while always rotating with the brake shaft. A plurality of cam follower lugs 102 are spaced around the circumference of and extend radially outwardly from follower major portion 98. The circumferential spacing between adjacent follower lugs 102 corresponds with the relative circumferential spacing of cam surfaces 94.

Brake assembly 70 includes a thrust bearing 104A which is engaged over the splined intermediate portion 100 of brake shaft 76 between cam follower 74 and the adjacent surface of an annularly shaped thrust plate 106a which in turn presses against the abutting end portion of an adjacent friction ring 78a. A corresponding thrust plate 106b and thrust bearing 104b are disposed on the opposite side of friction ring 78b. Thrust plates 106a and 106b are formed in a flat annular shape having a central clearance opening to enable the thrust plates to rotate relative to brake shaft 76. Thrust bearing 104b retained on a circular principal portion 108 of brake shaft 76 by a snap ring 110 which engages within a corresponding groove 112 formed in the adjacent end of the brake shaft principal portion. Thrust bearings 104a and 104b enable friction rings 78a and 78b and mandrel 80 to antifrictionally rotate relative to cam follower 74 and brake shaft 75 when such relative motion is permitted by overrunning clutch 122 as explained more fully below.

Friction rings 78a and 78b have an outer diameter which is nominally slightly smaller than the inside diameter of drum spool 28. The rings are formed with a slit 114 allowing the rings to expand in diameter when squeezed against mandrel 80. Slit 114 defines spaced apart ring ends 124 and 126. The inside diameter of rings 78a and 78b are formed in the shape of a frusto cone corresponding to and engageable with associated frustoconical portions 116a and 116b of mandrel 80. A plurality of longitudinal slots 118 are formed in spaced apart relationship about the inside diameter of friction rings 78a and 78b. Slots 118 are open in the radially inwardly direction and are sized to slidably engage with an associated drive pin 120a and 120b extending radially outwardly from the frustoconical portions 116a and 116b of mandrel 80.

An overrunning clutch assembly 122 is pressed within the inside diameter of mandrel 80 and is engaged over the circular major portion 108 of brake shaft 76 to permit the brake shaft to rotate clockwise relative to the mandrel, as viewed in FIG. 3, while locking the brake shaft to the mandrel when rotating in the opposite relative direction. Overrunning clutch assemblies, such as assembly 122, are well known in the art and are widely commercially available.

In the operation of brake-clutch assembly 24, when motor 20 is operated to power drive gear 56 in the clockwise direction, as shown in FIG. 3, to reel in a load attached to cable 13, the torque from the motor is transmitted from cam member 72 through cam follower 74, brake shaft 76, and then on to drum 12 through drive shaft 25. This torque load causes lugs 102 of cam follower 74 to slide or ramp up cam surfaces 94 thereby shifting the cam follower away from drive cam 72. Cam follower 74 acting through thrust bearings 104a and 104b and thrust plates 106a and 106b squeezes friction rings 78a and 78b against mandrel 80 thereby causing the friction rings to expand and press tightly against the inside diameter of drum spool 28 thereby preventing relative rotation between brake assembly 70 and drum 12. However, overrunning clutch assembly 122 permits brake shaft 76 to rotate freely in the clockwise relative to mandrel 80 even though the brake assembly itself is fixed relative to drum 12. As a result, the rotational torque from motor 20 is transmitted through drive shaft 25 and gear train 26 to rotate drum 12 in the reeling in direction, i.e. clockwise as viewed from the left in FIGS. 1 and 2.

If motor 20 is turned off or stopped when a load is attached to cable 13, for instance while reeling in the cable, the brake-clutch assembly 24 locks drum 12 to prevent the cable from unwinding. The load pulling on cable 13 imposes a torque load on drum 12, which torque load is transmitted through gear train 26 to place a counterclockwise torque load, on drive shaft 25 as viewed in FIG. 3 and from the left side of FIG. 2. This torque load on drive shaft 25 is in turn transmitted to cam follower 74 causing lugs 102 of the cam follower to slide or ramp up cam surfaces 94 thereby shifting the cam follower away from drive cam 72 and toward mandrel 80. The cam follower in turn squeezes friction rings 78a and 78b against mandrel 80 causing the rings to expand and lock against the inside diameter of drum spool 28. Because overrunning clutch 122 prevents counterclockwise rotation of both the brake shaft 76 and the drive shaft 25 relative to brake assembly 70, the drive shaft is locked relative to drum 12 thereby preventing the drum from rotating.

When the rotational direction of motor 20 is reversed, for instance, to reel out a load attached to cable 13, cam member 72 rotates counterclockwise relative to cam follower 74 causing the follower lugs 102 to slide or ramp downwardly along cam surfaces 94 thereby removing the thrust force from brake assembly 77 and allowing friction rings 78a and 78b to contract slightly away from the inside diameter of spool 28 to again permit relative rotation between the brake assembly and the drum spool. This allows brake shaft 76 and drive shaft 25 to rotate in the counterclockwise direction, as shown in FIG. 3 and from the left side of FIG. 2, to in turn rotate drum 12 in the counterclockwise or reel-out direction. When brake shaft 76 is rotated in the counterclockwise direction, it solidly locks with mandrel 80 through overrunning clutch 122 so that brake assembly 70 rotates at the same high speed as motor 20. If a substantial load is being carried by cable 13 while it is thusly being paid out by winch 10, the load on the cable applies a reverse torque on drum 12 tending to cause the drum to rotate faster than its normal rotating speed when driven by motor 20. This reverse torque is transmitted back through gear train 26 to drive shaft 25. If the reverse torque on drive shaft 25 exceeds the magnitude of the torque applied to the drive shaft by the counterclockwise rotation of motor 20, the resulting relative torque transmitted between the motor and the drive shaft causes cam follower 74 to rotate counterclockwise relative to drive cam 72. As a result, lugs 102 ramp up cam surfaces 94 causing the cam follower to shift to toward brake assembly 70 and expand friction rings 78a and 78b by squeezing them against mandrel 80. As the friction rings expand, they frictionally rub against the inside diameter of drum spool 28 to impose a relative drag load between drive shaft 25 and drum 12 thereby modulating the speed of the drum to prevent it from rotating any faster than its normal rotational speed when driven by motor 20.

It will be appreciated that when brake-clutch assembly 24 is functioning in this mode to control the speed of drum 12, large quantities of heat are generated by the rubbing of friction rings 78a and 78b against the inside diameter of spool 28. However, this heat is rapidly dissipated through the relatively large mass and surface area of drum 12 and cable 13. As a result, the temperature of friction rings 78a and 78b is maintained low enough to prevent a reduction in the friction coefficient between the friction rings and the drum spool and to prevent damage to the friction rings or to the drum spool or to the other components of winch 10.

The capacity of friction rings 78a and 78b to expand when thrust against mandrel 80 may be altered by varying the number of longitudinal slots 118 formed in the inside diameter of the friction rings which affects the flexibility of the friction rings. Also, the ability of the friction rings to expand automatically, i.e. the self-energizing capacity of the rings, when initially contacting against the inside diameter of drum spool 28 is dependent upon the particular slot, 18 in which drive pins 120a and 120b are engaged. When motor 20 is rotating in a counterclockwise direction, as viewed from the left side of FIGS. 1 and 2, to reel out cable 13, friction rings 78a and 78b also rotate in the counterclockwise direction relative to drum spool 28 which is rotating at a much slower speed, also in the counterclockwise direction. When friction rings 78a and 78b are rotating in this direction, ends 124 of the friction rings are considered the leading ends of the ring. The closer that the particular slot 118, which is engaged with drive pin 120a and 120b is located to leading ends 124, the less the rings tend to expand when initially contacting against the inside diameter of spool 28, and accordingly, the smaller the self energizing capacity of the friction rings. However, if drive pins 120a and 120b are engaged within different slots 118 located further away from leading ends 124, the increased circumferential distance between the slots and the leading ends 124 increases the tendency of the friction rings to expand when initially engaging against inside diameter of spool 28 thereby increasing the self-energizing capacity of the friction rings. As a result, the rate at which the drag load generated between the friction rings and the drum 12 increases with a given reverse torque load acting back on drive shaft 25 from the action of the drum attempting to overrun motor 20 may be selectively altered. In this manner, the sensitivity of brake assembly 70 may be selectively tuned to accommodate various factors, such as the capacity of winch 10, the size and rotational speed of motor 20 and the friction coefficient between friction rings 78a and 78b and the inside diameter of drum spool 28. Thus, brake assembly 70 may be adjusted to smoothly engage with and disengages from drum 12 thereby to avoid producing unwanted vibration or chatter in the components of winch 10.

Preferably, for economy of manufacture, friction rings 78a and 78b are constructed from reinforced plastic material, such as fiberglass filled nylon 6/6. Nylon 6/6 is known in the plastic industry as nylon which is "filled" with 40% fiberglass and is widely commercially available. This type of material has sufficient elasticity to enable the friction rings to readily expand when squeezed over mandrel 80, while also having sufficient strength to safely carry the torque loads transmitted through winch 10. It will be appreciated that by constructing brake assembly 70 to brake against the inside diameter of drum spool 28, the large quantities of heat generated during braking is dissipated fast enough through the large mass of drum 12 and cable 13 to prevent the temperature of friction rings from rising above the operating temperature of nylon 6/6.

As noted above, reversible motor 20 drives drum 12 at a reduced speed through brake-clutch assembly 24 and gear train 26. The gear train is disposed within a housing 22 mounted on right hand support structure 16. Preferably housing 22 is composed of an end housing 127 and a cylindrical section 128 disposed between the end housing and support structure 16, as described more fully below. Gear train 26 includes first, second and third stage planetary drives 130, 184, and 200, respectively, interconnected together in torque transmitting relationship. The planetary drives efficiently reduce the speed of and multiply the torque produced by motor 20, thereby enabling winch 10 to handle sizable loads.

Gear train 26 includes an elongate drive shaft 25 disposed coaxially along drum central axis 18. Preferably drive shaft 25 is hexagonal in cross section to snugly engage within a correspondingly-shaped blind bore formed in the right hand end portion of brake shaft 76, as illustrated in FIG. 2. Drive shaft 25 extends longitudinally from brake drive shaft 76 through drum spool 28 and into the interior of housing 22 to antirotationally engage with a sun gear 129 of a first stage planetary drive 130 of gear train 26. As most clearly illustrated in FIG. 4, sun gear 129 is formed with a hexagonally shaped center bore for receiving the right hand end portion of drive shaft 25. Sun gear 129 includes a circular, reduced diameter shoulder portion 132 which antifrictionally journals within a bushing 134 pressed within a blind bore formed within a central hub 136 extending longitudinally along axis 18 from the inside surface of an end wall 138 of end housing 127. A thrust washer 140 is sandwiched between the bottom of the hub central bore and the adjacent end of bushing 134 to axially restrain drive shaft 25 and sun gear 129.

Figure 4:
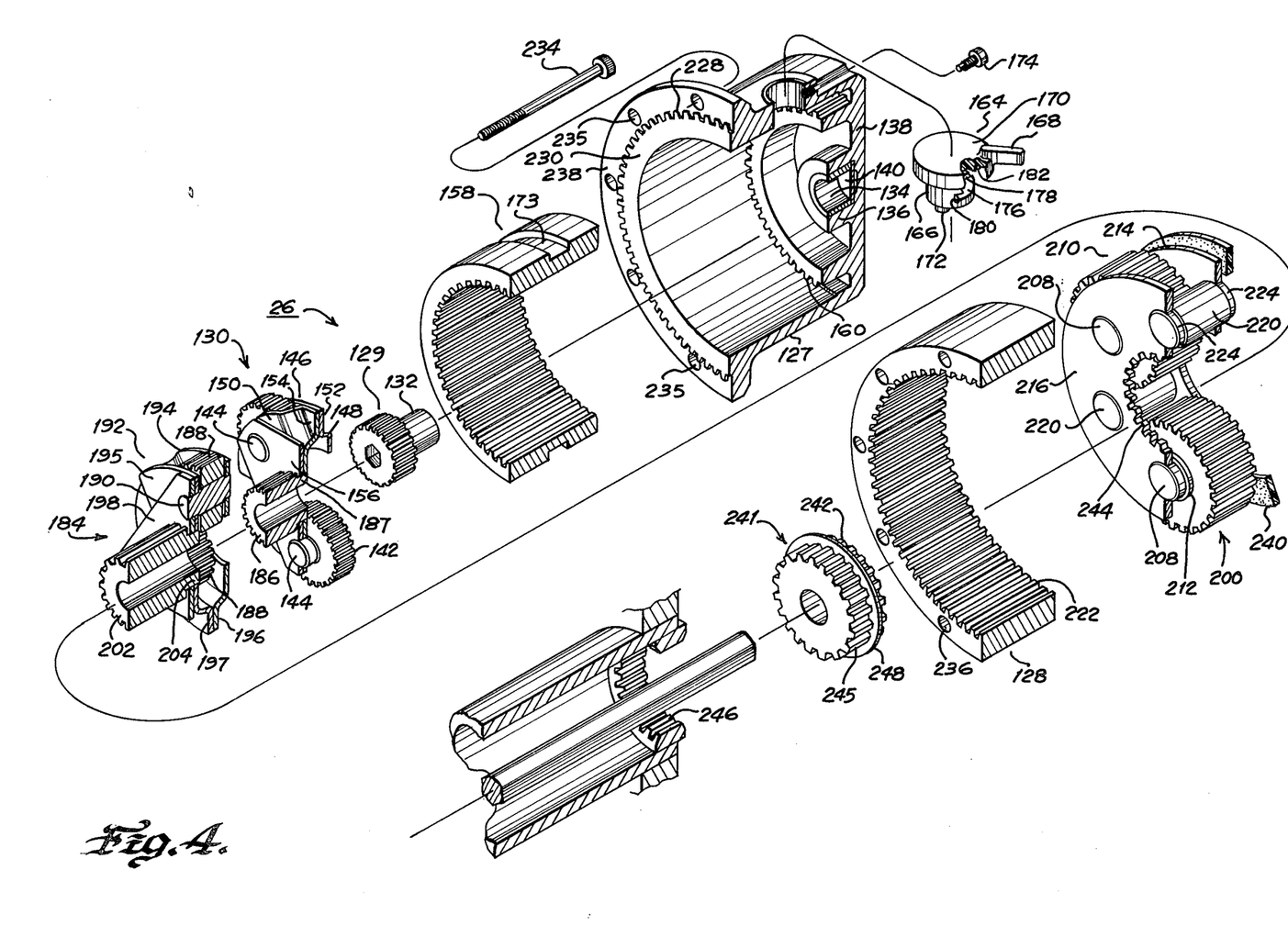
FIG. 4 is an isometric, exploded view of the gear train of the present invention taken from the left side of FIGS. 1 and 2.

Sun gear 129 meshes with a set of three pinion gears 142 which are rotatably mounted on pins 144 of a first stage planetary carrier 146. Carrier 146 is composed of two generally annularly-shaped carrier plates 148 and 150 having corresponding offset or depressed portions 152 and 154, respectively, which are secured together in contacting relationship to spaced plates 148 and 150 apart from each other in parallel relationship to receive pinion gears 142 therebetween. Pins 144 extend through aligned openings formed in carrier plates 148 and 150 at locations between adjacent plate depressed portions 152 and 154. Carrier 146 also includes a flat, triangularly shaped reinforcing plate 156 secured in face-to-face relationship with the side of carrier plate 150 opposite plate 148. It will be appreciated that constructing carrier 146 with formed plates 148 and 150 and with reinforcing plate 156 results in a lightweight but rigid structure for securely supporting pinion gears 142.

First stage pinion gears 142 mesh with a cylindrically-shaped double ring gear 158 which is slidably engageable and disengageable with a stationary gear 160 formed as an integral part of end housing 127. Stationary gear 160 extends transversely from the inside surface of housing end wall 138 and is disposed coaxially with drum rotational axis 18. The end of gear 160 opposite wall 138 serves as an abutment for first stage planetary carrier 146.

Double ring gear 158 is selectively axially shiftable within the close fitting inside diameter of end housing 127 for engagement with and disengagement from stationary gear 160 by a manually operable shifting lever 164. As illustrated in FIGS. 2 and 4, shifting lever 164 is composed of a circular hub portion 166 which rotatably engages within a close fitting circular bore extending radially through end housing 127. Shifting lever 164 includes a short handle 168 extending radially outwardly from an enlarged circular cap or top portion 170 of the shifting lever. A circular stud 172 extends downwardly from the bottom of hub portion 166 to engage within a close fitting groove 173 formed around the outer circumference of double ring gear 158. Stud 172 is offset from the rotational center of hub portion 166 to act as an eccentric or cam when the shifting lever is rotated to thus slide double ring gear 158 axially into engagement with and out of engagement from stationary gear 160.

As most clearly illustrated in FIG. 4, shifting lever 164 is rotatable between a first angular position, shown in solid line in FIG. 1, wherein ring gear 158 is in engagement with stationary gear 160 and a second position, shown in dashed line in FIG. 1, wherein the ring gear is spaced axially out of engagement from gear 160. The maximum angular rotation of shifting lever 164 is limited by a dog screw 174 having a smooth circular reduced diameter tip portion which engages within a pie-shaped undercut recess 176 formed in the hub portion 166 of shifting lever 164 immediately below the cap or top portion 170. The rotation of shifting lever 164 is limited by abutment of dog screw 170 with the ends of the undercut recess 176. Radially extending grooves 178, 180 are formed in hub portion 166 at the ends of undercut recess 176 to form detents which lock with the tip portion of dog screw 174. The tip portion of the dog screw 174 is held in positive engagement with grooves 178, 180 by a resilient O-ring 182 which is disposed within a circular groove formed in the underside of shifting lever top portion 170. The O-ring seals against the adjacent flat portion of end housing 127 to exert an upward force on the shifting lever which in turn tends to positively engage the dog screw within grooves 178, 180.

When actuating lever 164 is disposed in the orientation as illustrated in solid line in FIG. 1, double ring gear 158 is disposed in engagement with stationary gear 160. As the actuating lever is rotated clockwise, stud member 172 pushes against the side of ring gear outer groove 173 to slide the double ring gear to the left as shown in FIG. 2. When the actuating lever is fully rotated in the clockwise direction into the dashed line position shown in FIG. 1, the double ring gear is disengaged from stationary gear 160 permitting the double ring gear to freewheel, thereby deactivating first stage planetary drive 130.

A second stage planetary drive 184 is disposed alongside first stage planetary drive 130 within end housing 127. The second stage planetary drive 184 includes a sun gear 186 which is antirotationally fixed to carrier 146 of the first stage planetary drive. Sun gear 186 has a reduced diameter shoulder 187 which pilots within a central opening formed in reinforcing plate 156 and formed in corner plate 150. A clearance opening extends through the center of sun gear 186 for engaging over drive shaft 25. Sun gear 186 meshes with a set of three pinion gears 188 of the second stage planetary drive 184 which are rotatably mounted by pins 190 on a second stage carrier assembly 192. As with carrier assembly 146, carrier assembly 192 is composed of a pair of spaced apart, generally annularly-shaped carrier plates 194 and 195 disposed on opposite sides of pinion gears 188. Carrier plates 194 and 195 have recessed or indented portions 196 and 197 which are mated together in face-to-face relationship by weldments or other suitable means to secure the carrier plates rigidly to each other. Also, as with first stage carrier 146, second stage carrier 192 includes a generally triangularly shaped reinforcing plate 198 which is disposed in face-to-face relationship with the exterior side of carrier plate 195. Second stage pinion gears 188 mesh with double ring gear 158. Thus, the second stage planetary drive 184 is also deactivated when double ring gear 158 is disengaged from stationary gear 160 to thereby disconnect drum 12 from drive shaft 25. Second stage planetary drive 184 is positioned along drive shaft 25 relative to first stage planetary drive 130 by abutment of the adjacent ends of first stage sun gear 129 with second stage sun gear 186.

Drive train 26 further includes a third stage planetary drive 200 disposed along side second stage planetary drive 184. The third stage planetary drive includes a sun gear 202 which is affixed to carrier assembly 192 of the second stage planetary drive. Sun gear 202 includes a reduced diameter, circular shoulder portion 204 which is fixedly engaged within aligned central openings formed in reinforcing plate 198 and carrier plate 196 of second stage carrier assembly 192 to support sun gear 202 transversely from the second stage carrier assembly. A clearance through bore is formed centrally within sun gear 202 to provide clearance between the sun gear and drive shaft 25.

Sun gear 202 meshes with a set of three pinion gears 206 which are rotatably mounted on pins 208 of a third stage carrier assembly 210. Bushings 212 are pressed within central bores formed in pinion gears 206 to antifrictionally journal the pinion gears over pins 208. Preferably bushings 212 are constructed from a low coefficient of friction, self-lubricating material, such as bronze. Carrier assembly 210 also includes a pair of flat, annular plates 214 and 216 disposed on opposite sides of pinion gears 206 for supporting pins 208 120° apart from each other about the center of carrier assembly 210 in a well-known manner. Pins 208 have reduced diameter shoulders 218 at each end which engage through aligned holes formed in plates 214 and 216. Preferably the ends of pins 208 are staked or otherwise secured to the carrier plates. The carrier plates are supported in spaced parallel relationship on opposite sides of pinion gears 206 by spacer pins 220, with each pin 220 disposed between pinion gear pins 208. As with pins 208, the ends of spacer pins 220 are formed with reduced diameter shoulders 224 which engage with aligned openings formed in carrier plates 214 and 216. As with pins 208, preferably the ends of spacer pins 220 are staked or otherwise securely fastened to carrier plates 214 and 216.

Third stage pinion gears 206 mesh with a stationary ring gear 222 formed as an integral portion of housing cylindrical section 128. Housing cylindrical section 128 is held in proper alignment with end housing 127 by engagement of the teeth of ring gear 222 with a thin external gear 228 integrally formed in the adjacent end face 230 of end housing 127. Likewise, housing cylindrical section 128 is centrally aligned with drum spool 12 by engagement of the teeth of ring gear 222 with a thin external gear 50 integrally formed in the adjacent face of drum support structure 16. End housing 127 and cylindrical section 128 of housing 22 are secured to support structure 16 by a series of elongate bolts 234 extending through clearance holes 235 which extend through a flanged portion 238 of end housing 127. Bolts 234 also extend through aligned clearance holes 236 formed in housing cylindrical portion 128 to engage with aligned threaded holes formed in mounting structure 16.

Third stage carrier assembly 210 is restrained against movement longitudinally along axis 18 by a thrust ring 240 which in interposed between the outer perimeter of third stage carrier plate 214 and the adjacent end face 230 of housing end section 127. Preferably thrust ring 240 is formed from a self-lubricating material such as bronze or plastic.

Preferably the components of first, second and third stage planetary drives 130, 184 and 200 are sized to produce a 6:1 speed reduction each for a total speed reduction of 216:1. The size of pinion gears 142, 188 and 206 progressively increase in size to reflect the fact that the first, second and third stage planetary drive assemblies progressively carry an increased torque load.

Third stage planetary gear assembly 210 is interconnected in torque transmitting relationship with drum 12 by a double connection gear 241 composed of a larger first gear 242 which meshes with an internal gear 244 integrally formed in the central portion of third stage carrier plate 216. Connection gear 241 also includes a smaller gear 245 which meshes with an internal gear 246 fixedly disposed within the adjacent end portion of drum spool 28. A thrust ring 248 is disposed within a groove 250 formed around the circumference of connection gear 241 between gears 242 and 245 to bear against the side of the teeth of larger gear 242 to longitudinally restrain the connection gear 241 and maintain it in meshing relationship with internal gears 244 and 246. A central clearance opening extends through connection gear 241 to permit the gear to extend over drive shaft 25.

It will be appreciated that the above-described construction of plantetary drives 130, 184 and 200 and housing 22 results in a compact gear train 26 which efficiently reduces the speed of and increases the torque from drive shaft 25 to power drum 12. Also, winch 10 may be conveniently manually shifted between a freewheeling and power transmitting mode by simply rotating shifting lever 164. In the freewheeling mode, cable 13 may be manually and quickly unwound from drum 12, for instance when desiring to attach the end of the cable to a tree or some other object located at a distance from winch 10. When the winch is shifted to its freewheeling mode, i.e. by rotating actuating lever 164 to the phantom line position shown in FIG. 1, double ring gear 158 is disengaged from stationary gear 160 so that first and second stage planetary drives 130 and 184 do not transmit torque between third stage planetary drive 200 and drive shaft 25. However, a certain amount of drag force is applied to drum 12 by the third stage planetary drive assembly 200 which is rotated by the drum when cable 13 is being paid out. As a consequence, the drum will not continue to spin after the pull on cable 13 has been terminated, thus avoiding tangling of the cable.

As will be apparent to those skilled in the art to which the invention is addressed, the present invention may be embodied in forms other than those specifically disclosed above, without departing from the spirit or essential characteristics of the invention. The particular embodiment of winch 10 described above is therefore to be considered in all respects as illustrative and not restrictive, i.e. the scope of the present invention is as set forth in the appended claims rather than being limited to the example of the winch 10 set forth in the foregoing description.

What is claimed is:

1. A winch comprising:
   (a) a hollow cable winding drum rotatable about a longitudinal axis;
   (b) reversible motor means disposed longitudinally of a first end of said drum;
   (c) power transmission means operably connected to said drum and disposed longitudinally of an opposite second end of said drum, said power transmission means including drive shaft means extending longitudinally through the interior of said drum toward said first end of said drum;
   (d) brake-clutch means disposed within said drum and operably interconnecting said motor means with said drive shaft means, said brake-clutch means including:
     (1) brake means automatically frictionally engageable directly against and disengageable from the inside diameter of said drum in response to the magnitude and direction of the torque load transmitted between said motor means and said drive shaft means; and
     (2) overrunning clutch means disposed between said drive shaft means and said brake means permitting relative rotation between said drive shaft means and said brake means in a first direction and preventing relative rotation between said drive shaft means and said brake means in the opposite direction;
   (e) wherein said brake means comprises:
     (1) at least one friction ring assembly, said friction ring assembly including a frustoconically-shaped mandrel coupled to said overrunning clutch means, a correspondingly shaped frustoconical expandable friction ring antirotationally coupled to said mandrel, and means for antirotationally coupling said friction ring to said mandrel to prohibit relative rotation while allowing relative longitudinal movement between said friction ring and said mandrel; and
     (2) actuator means responsive to the magnitude and direction of the torque acting on said drive shaft means for expanding said friction ring against the inside diameter of said drum and for contracting said friction ring away from the inside diameter of said drum depending on the magnitude and direction of the torque load transmitted between said motor means and said drive shaft means; and
   (f) wherein said actuator means includes a cam member antirotationally coupled with said motor means, said cam member having an axially facing cam surface, and a cam follower antirotationally coupled with and axially slidable along said drive shaft means, said cam follower coacting with said cam member to:
     (1) slide axially toward said friction ring assembly when the torque load is being transmitted between said motor means and said drive shaft in a first direction to thereby urge said friction ring and said mandrel towards each other to expand said friction ring against the inside diameter of said drum means; and (2) slide axially away from said friction ring assembly to allow said friction ring and said mandrel to shift longitudinally away from each other thereby to enable said friction ring to contract away from the internal diameter of said drum.

2. The winch according to claim 1, wherein:
said friction ring includes a plurality of axially disposed grooves spaced about the internal diameter of said ring; and
said means for antirotationally coupling said friction ring to said mandrel comprises lug means projecting radially outwardly from said mandrel to engage in one of said grooves of said friction ring thereby to antirotationally couple said mandrel with said friction ring while permitting said mandrel and said friction ring to slide longitudinally relative to each other, with the engagement of said lug means within a particular friction ring groove varying the ability of said friction ring to expand automatically against the inside diameter of said drum.

3. The winch according to claim 2, wherein said friction ring is formed from a compound composed of nylon and fiberglass material.

4. The winch according to claim 3, wherein the fiberglass comprises approximately forty percent of the compound by weight.

5. A winch comprising:
(a) a hollow cable winding drum rotatable about a longitudinal axis;
(b) reversible motor means disposed longitudinally of a first end of said drum;
(c) power transmission means operably connected to said drum and disposed longitudinally of an opposite second end of said drum, said power transmission means including drive shaft means extending longitudinally through the interior of said drum toward said first end of said drum;
(d) brake-clutch means disposed within said drum and operably interconnecting said motor means with said drive shaft means, said brake-clutch means including:
(1) brake means automatically frictionally engageable directly against and disengageable from the inside diameter of said drum in response to the magnitude and direction of the torque load transmitted between said motor means and said drive shaft means; and
(2) overrunning clutch means disposed between said drive shaft means and said brake means permitting relative rotation between said drive shaft means and said brake means in a first direction and preventing relative rotation between said drive shaft means and said brake means in the opposite direction;
(e) wherein said brake means comprises:
(1) at least one friction ring assembly, said friction ring assembly including a frustoconically-shaped mandrel coupled to said overrunning clutch means, a correspondingly shaped frustoconical expandable friction ring antirotationally coupled to said mandrel, and means for antirotationally coupling said friction ring to said mandrel to prohibit relative rotation while allowing relative longitudinal movement between said friction ring and said mandrel; and p2 (2) brake actuator means responsive to the magnitude and direction of the torque acting on said drive shaft means for expanding said friction ring against the inside diameter of said drum and for contracting said friction ring away from the inside diameter of said drum depending on the magnitude and direction of the torque load transmitted between said motor means and said drive shaft means;
(f) a first support structure rotatably supporting the first end portion of said drum, and a second support structure rotatably supporting the opposite, second end portion of said drum;
(g) a housing mounted on said second support structure to encase portions of said power transmission means; and
(h) said power transmission means having at least one planetary drive means disposed within said housing, said planetary drive means including a first ring gear, and coupling means rotatable about an axis transverse to said drive shaft means for selectively antirotationally coupling and decoupling said first ring gear to said housing to interconnect said drum to said power transmission means and to disconnect said drum from said power transmission means, respectively.

6. The winch according to claim 5, wherein said first ring gear is axially slidable relative to said housing and said coupling means include means fixed stationarily to said housing for slidably receiving said first ring gear.

7. The winch according to claim 6, wherein said coupling means includes a stationary gear integrally formed with said housing and shifter means for selectively sliding said ring gear into engagement with and out of engagement from said housing stationary gear.

8. The winch according to claim 5, 6, or 7, wherein said power transmission means includes a first stage planetary drive means and a second stage planetary drive means coupled together in power transmission relationship and disposed together within said housing, said first and second stage planetary drive means including a common ring gear selectively anti-rotationally coupleable with and decoupleable from said housing.

9. The winch according to claim 8, further including a third stage planetary drive means coupled between said second stage planetary drive means and said drum, said third stage planetary drive means including a ring gear disposed stationarily relative to said housing.

10. The winch according to claim 9, wherein said third stage planetary drive means ring gear forms a portion of said housing.

11. The winch according to claim 5, wherein said first and second drum support structures are substantially identical in shape.

12. A winch comprising:
(a) a hollow winding drum having a first end and a second end, said drum being rotatable about a longitudinal axis;
(b) reversible motor means disposed adjacent said first end of said drum;
(c) power transmission means operably connected to said drum and disposed at said second end of said drum, said power transmission means including drive shaft means extending longitudinally through the interior of said drum and operably interconnected to said motor means;

(d) brake means disposed within said drum and operably interconnected with said drive shaft means;

(e) overrunning clutch means operably interconnecting said drive shaft means to said brake means to permit relative rotation between said drive shaft means and said brake means in a first direction and preventing relative rotation between said drive shaft means and said brake means in the opposite direction;

(f) actuating means having a first portion antirotationally fixed to said motor means and a second portion antirotationally fixed to said drive shaft means to transmit torque between said motor means and said brake shaft means, said actuating means actuating said brake means into direct frictional engagement with the interior of said drum in response to the relative direction and magnitude of the torque transmitted between said motor means and said drive shaft means through said actuating means;

(g) wherein said brake means comprises an expandable first portion, and a second portion operably interconnected to said overrunning clutch means and antirotationally connected to said expandable first portion, wherein said brake means first portion includes a split friction ring and said brake means second portion is engageable against the inside diameter of said split friction ring;

(h) said actuating means shifts said brake means first portion relative to said brake means second portion for expanding said brake means first portion against the interior of said drum and contracts said brake means first portion away from the interior of said drum in response to the relative direction and magnitude of the torque transmitted between said motor and said drive shaft through said actuating means; and (i) wherein said friction ring is formed from a compound composed of nylon and fiberglass.

13. The winch according to claim 12, wherein the fiberglass comprises approximately forty percent of the compound by weight.

14. The winch according to claim 12, wherein:
said split friction ring includes a frustoconically shaped inside diameter;
said brake means second portion includes a corresponding frustoconically shaped mandrel;
said brake means further comprising pin means extending outwardly from said mandrel to prohibit relative rotation between said mandrel and said friction ring while allowing relative longitudinal movement between said mandrel and said friction ring; and
said actuating means shifting said friction means and said mandrel longitudinally relative to each other along the axis of said drive shaft means to expand and contract said friction ring.

15. The winch according to claim 14, wherein said actuating means includes a first cam member antirotationally coupled with said motor means, said first cam member having an axially facing cam surface; and a second cam member antirotationally coupled to said drive shaft means and slidable along said drive shaft means, said first and second cam members coacting together to force said first and second cam members relatively away from each other to:
urge said friction ring and said mandrel towards each other to expand said friction ring against the inside diameter of said drum means when the relative torque transmitted between said first and second cam means acts in a first direction; and
allow said first and second cam members to shift towards each other to allow said friction ring and said mandrel to shift longitudinally in opposite directions relative to each other to enable said friction ring to contact away from the inside diameter of said drum when the relative torque transmitted between said first and second cam members acts in the opposite direction.

16. The winch according to claim 12, wherein said actuating means first portion including a first cam and said actuating means second portion includes a coacting second cam movable relative to said first cam in response to the relative direction and magnitude of the torque transmitted between said motor means and said drive shaft means through said first and second cams to frictionally engage said brake means against and disengage said brake means from the inside diameter of said drum.

17. The winch according to claim 12, further comprising a pair of identically constructed support structures rotatably supporting the first and second end portions of said drum.

18. The winch according to claim 12:
further comprising a housing disposed adjacent the second end of said drum to encase portions of said power transmission means, said housing being nonrotatable; and
said power transmission means having a first stage planetary drive means operably interconnected with said drive shaft means and disposed within said housing, said first stage planetary drive means including a first ring gear; and coupling means for selectively antirotationally coupling and rotationally decoupling said first ring gear to said housing to interconnect said drum to said drive shaft means and to disconnect said drum from said drive shaft means, respectively.

19. The winch according to claim 18, wherein:
said first ring gear being axially slidable relative to said housing;
said housing means includes gear means fixed stationarily to said housing; and
shifting means for selectively sliding said first ring into engagement with and out of engagement from said housing stationary gear.

20. The winch according to claim 19, wherein said housing stationary gear is integrally formed with said housing.

21. The winch according to claim 18 or 19, wherein said power transmission means further includes second stage planetary drive means coupled in power transmission relationship with said first stage planetary drive means and disposed alongside said first stage planetary drive means within said housing, said first ring gear also comprising the ring gear of said second stage planetary drive means.

22. The winch according to claim 21, further comprising a third stage planetary drive means coupled in power transmission relationship between said second stage planetary drive means and said drum, said third stage planetary drive means including a ring gear fixed stationarily relative to said housing.

23. The winch according to claim 22, wherein said third stage planetary drive means ring gear is integrally formed with said housing.

* * * * *